April 20, 1943.  O. L. BERBY  2,317,171
CLUTCH
Filed March 28, 1940  2 Sheets-Sheet 2
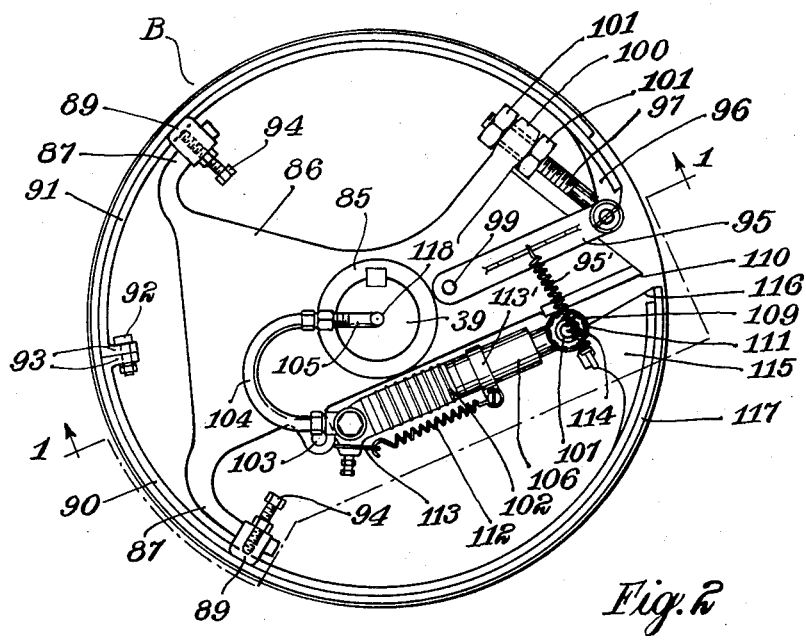
Fig. 2
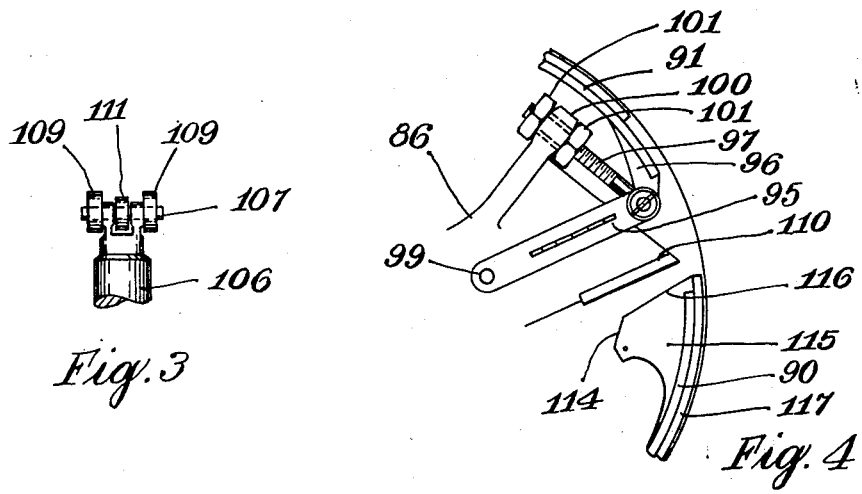
Fig. 3
Fig. 4
Inventor
Ola L. Berby
By Robert M. Dunning
Attorney Patented Apr. 20, 1943

2,317,171

UNITED STATES PATENT OFFICE 2,317,171

CLUTCH

Ola L. Berby, Duluth, Minn., assignor to Clyde Iron Works, Duluth, Minn., a corporation of Maine Application March 28, 1940, Serial No. 326,403

3 Claims. (Cl. 192—85)

My invention relates to an improvement in clutches, wherein it is desired to provide a simple, quick acting clutch.

It is the object of the present invention to provide a clutch which includes a clutch drum and a relatively rotatable support. An expandable member is carried by the support designed to engage against the brake drum. A pair of cam races are secured to the ends of the expandable member and a cam roller device is provided for engaging the cam races to actuate the same. The last one of the came races is provided with two sections of varying angularities, one of which when engaged tends to expand the expandable member quickly while the other of which when engaged tends to expand the expandable member more slowly. The two sections of the cam are so arranged that the expandable member will be quickly expanded during the first part of the expansive movement and will be more slowly expanded when the slack in the expandable member has been taken up.

It is a feature of the present invention that the clutch band is quickly tightened against its drum with a relatively short stroke of the operating control, and at the same time as power is supplied the leverage changes to provide a mechanical advantage in favor of the operator. In other words even the clutch band has been drawn into contact with its drum with a relatively short movement of the operating control. A relatively longer movement of the control is required to tighten the band upon its drum. This permits the slack of the band to be quickly and easily taken up without losing the leverage necessary for the tightening of the bands.

A further feature of the present invention lies in the particular arrangement of the cam rollers and the manner in which they engage their respective cam races. Two rollers of relatively large diameter engage one cam race, while a relatively smaller diameter cam roller engages the other cam race. As a result the strain is centralized between the cam races and excessive friction is avoided.

Another object of the present invention lies in the particular arrangement of the hydraulically operating member for actuating the clutch. This hydraulically operated member comprises an expandable device pivoted at one end to the rotatable support and the clutch is pivoted at its opposite end to the cam rollers.

These and other objects and novel features of my invention will be more clearly and fully set forth in the following specification and claims.

In the drawings forming a part of my specification:

Figure 2 is an elevational view of the clutch which secures the drum for rotation with the drum shafts.

Figure 3 is a view of a detail portion of the clutch.

Figure 4 is a detail view of the cam races.

Figure 1:
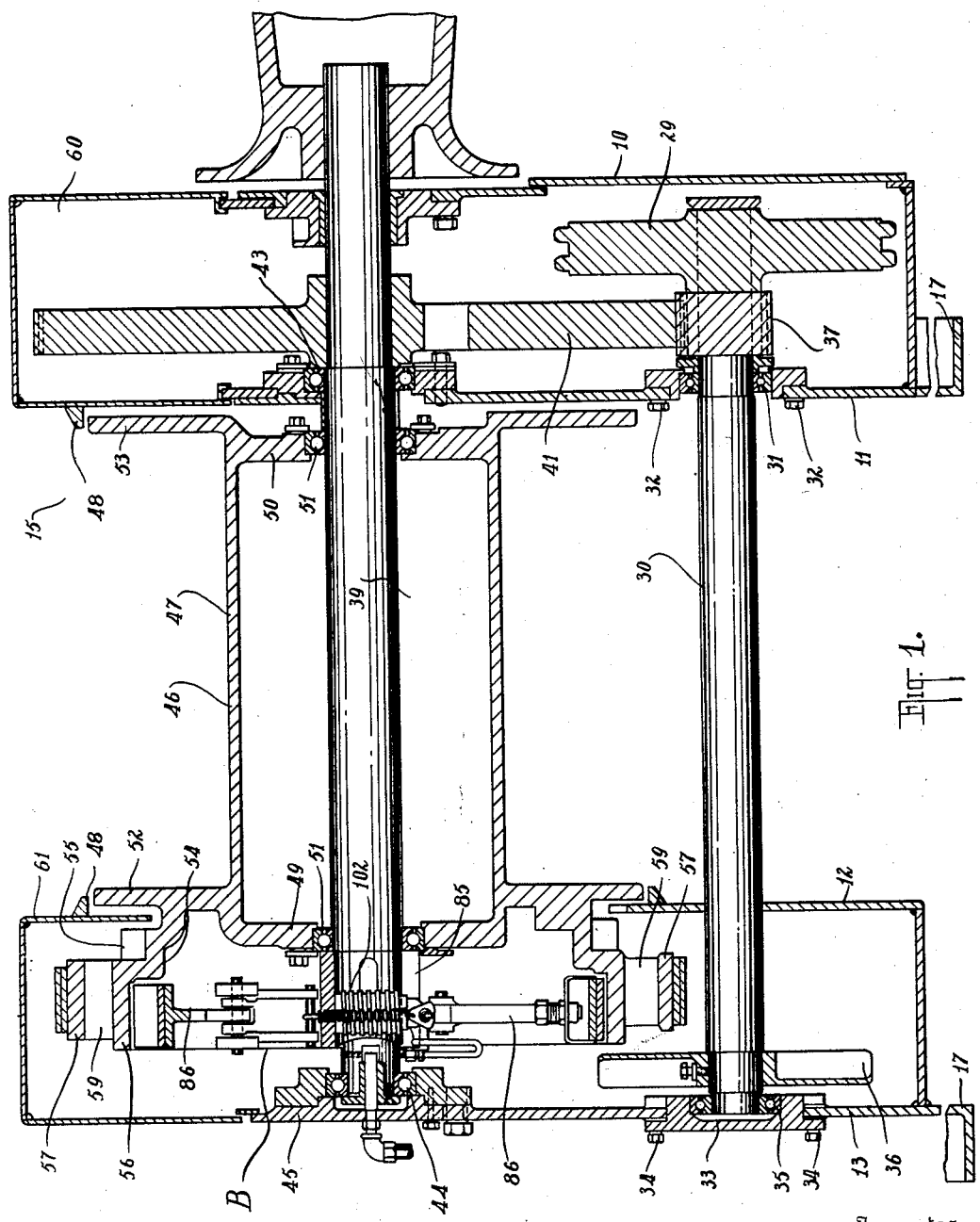
Figure 1 is a cross-sectional view through a hoist showing a hoist drum and disclosing the drum supporting elements.

The hoist is provided with a series of parallel vertically extending frame panels 10, 11, 12, and 13. The panel 10 forms one side of the housing. The panel 11 provides a supporting panel lining one side of the hoisting drum well 15. The panel 12 forms the opposite wall of the hoisting drum well 15. All of the various panels 10, 11, 12, 13, and 14 are supported upon a base including longitudinally extending beams 17.

As best illustrated in Figure 1 of the drawings, the drive shaft 30 is supported by a sealed ball bearing 31 mounted on the panel 11 and secured thereto by any suitable means, as by the bolts 32. The shaft 30 extends through the panels 11 and 12, and is supported by a sealed ball bearing 35 mounted on the panel 13 and secured thereto by bolts 34 and cap 33.

A fan 36 may, if desired, be mounted upon the shaft 30 to cause a circulation of air to cool the brake and clutch drums which will be later described. A pinion 37 is also positioned on the shaft 30 and rotates therewith when this shaft 30 is driven by the sprocket 29 from any suitable source of power supply. The pinion is mounted between the sprocket 29 and the panel 11.

A drum shaft 39 extends parallel to the drive shaft 30. A gear 41 is mounted on the shaft 39 to engage the pinion 37 on the drive shaft 30 so that the shaft 39 will rotate when the drive shaft 30 is rotated.

As noted in Figure 1 of the drawings the shaft 39 is supported by a ball bearing 43 secured to the panel 11 and by a ball bearing 44 secured to the panel 13 by means of an end cap or plate 45. The cable drum 46 is provided with a cylindrical shell having inwardly extending end flanges 49 and 50. Ball bearings 51 are interposed between these end flanges 49 and 50 and the shaft 39. Circular end cable guide flanges 52 and 53 extend outwardly from the shell 47. The flange 52 extends closely adjacent the panel 12, while the flange 53 is closely adjacent the panel 11. Protecting rings 48 on the panels 11 and 12 encircle the guide flanges 52 and 53.

A substantially cylindrical flange 54 extends outwardly from the guide flange 52 through the panel 12. A ratchet gear 55 encircles the flange 54; and a clutch drum 56 is secured to this flange 54. A clutch B is mounted upon the shaft 39 engageable with the clutch drum 56 to cause rotation of the drum 46 with the shaft. A brake drum 57 is connected to the clutch drum by means of spaced fins 59, and a brake band encircles the drum 57 in a manner which will be later described.

It will be seen that the drive shaft 30 and the drum shaft 39 are supported by the vertical panels mounted in spaced relationship. Inverted trough-shaped covers 60 and 61 close the top of the space between the panels 10 and 11, and between the panels 12 and 13, respectively. The upper edges of the panels 10, 11, 12, and 13 incline forwardly along substantially the same plane, and the covers 60 and 61 enclose the gears, and the clutches and brakes, respectively. The hoisting drum well 15 is not covered, the space between the panels 11 and 12 being open to provide access to the hoisting drums or cable drums 46.

The clutch B is best illustrated in Figures 2, 3, and 4 of the drawings. In this clutch, a collar 85 is mounted on the shaft 39 to rotate with the shaft. A spider 86 extends outwardly from the collar 85, and a pair of spaced arms 87 are formed on this spider 86. Substantially U-shaped clips 89 are secured to the arms 87. These clips 89 straddle the arcuated clutch shoes 90 and 91 which are bolted together at their abutting ends by bolts 92 which extend through end flanges 93. The clips 89 hold the shoes 90 from axial movement. Adjusting bolts 94 extending through the arms 87 adjust the position of the shoes 90 with respect to the arms 87.

The end of the shoe 91 not attached to the shoe 90 is pivotally secured to a pair of links 95 on either side of the spider 86. A pair of lugs 96 are secured to, and extend beyond the end of the shoe 91. A pivot pin extends through the opposed links 95, the lugs 96, and through an eye-bolt 97. The links 95 are pivotally attached to the spider 86 by means of a pivot pin 99. The eye-bolt 97 extends through a shoulder 100 on the spider 86. Nuts 101 on the eye-bolt provide a means of regulating the position of this fastened, or "dead," end of the clutch shoes.

A hydraulic cylinder 102 is pivoted at 103 to the spider 86. A connecting pipe or tube 104 extends from the cylinder 102 to a radial passage 105 through the collar 85 and the shaft 39 to communicate with an axial opening 118 in the shaft 39. The end 106 of the cylinder 102 is movable with respect to the pivot 103, and supports a transverse pivot 107 upon which is mounted three rollers as illustrated in Figure 3 of the drawings. The outer of these rollers 109 engage against a bearing track 110 on the spider 86. The center roller 111 engages against an inclined track secured to the outer end of the clutch shoe 90. A spring 95' adjustable in tension, extends between the inclined track end of the shoe 90 and the link 95 on each side of the spider 86.

A spring 112 extends between a bracket 113 on the pivoted end of the cylinder 102 and the extendable or piston end 106 thereof, being connected to a bracket 113' encircling the relatively movable end of the cylinder 102. This spring tends to hold the rollers 109 and 111 and hydraulic cylinder and piston in retracted position. When fluid is forced into the cylinder 102, however, the end 106 thereof moves longitudinally. The rollers 109 engage the track 110, while the roller 111 engages against the considerably angled portion 114 of the cam 115 on the end of the shoe 90. It will be seen that a small expansion of the cylinder 102 forces the shoes to expand a considerable amount, urging the friction surface 117 on the shoes 90 and 91 into engagement with the clutch drum 56.

Further expansion of the cylinder 102 gradually causes the roller 111 to be forced to the end of the considerably angled portion 114 of the cam 115, and on to the slightly angled portion 116 of the cam 115. It will be seen that longitudinal movement of the roller 111 against the portion 116 of the cam 115 will spread the cam and track 110 apart very slowly. Thus a greater leverage is provided to force the clutch shoes against the drum after the clutch shoes have been moved into engagement with the drum.

In other words, for a given expansion of the cylinder 102, the friction band will be expanded quickly as long as the roller is in engagement with the portion 114 of the cam 115. The clutch band will be quickly expanded into engagement with the clutch drum 56. At this time, however, the roller 111 is moved into engagement with the portion 116 of the cam 115. Then for the same given expansion of the cylinder 102, the friction band will be expanded relatively slowly. Greater leverage is thus acquired when it is needed; and the amount of pressure required to engage the clutch is reduced.

As has been previously stated, the clutch units and the hoisting drums are identical. Both of the shafts 39 and 40 have central passages or axial openings 118. As will be later described, hydraulic pressure is introduced into the axial openings by hydraulic cylinders operated by manual control levers.

In accordance with the patent statutes, I have described the principles of construction and operation of my hoist; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A clutch including a clutch drum, a support concentrically rotatable with respect to said drum, an expandable member supported by said support, a pair of cam races connected to the ends of said expandable member to expand the same when actuated, one of said cam races being relatively wide and the other thereof being relatively narrow, a pair of axially spaced cam rollers engaging said relatively wide cam race, a relatively smaller diameter cam roller coaxial with, and between, said pair of cam rollers and engageable with said relatively narrow cam race, and means for urging said cam rollers along said cam surfaces to expand said expandable member.

2. A clutch including a clutch drum, a support rotatable with respect to said drum, an expandable member supported by said support, a pair of diverging cam races secured to the ends of the expandable member which, when actuated, expand said expandable member, one of said cam races being relatively wide and the other being relatively narrow, a pair of axially spaced coaxial cam rollers engageable with said relatively wide cam race, a relatively smaller diameter cam roller coaxial with, and between, said pair of cam rollers, said last named cam roller engaging said relatively narrow cam race, and means for urging said cam rollers between said diverging cam races to expand said expandable member.

3. A clutch including a clutch drum, a support rotatable relative to said drum, an arcuated expandable member supported by said support and expandable against said drum, link means connecting one end of said expandable member to said support, diverging cam races on the ends of said expandable member which, when actuated, expand said expandable member, a pair of spaced coaxial cam rollers engaging the cam race at one end of said expandable member, and a cam roller between said spaced cam rollers and coaxial therewith engaging the other of said cam races.

OLA L. BERBY.